(12) United States Patent
Karasulu et al.

(10) Patent No.: US 11,769,183 B2
(45) Date of Patent: Sep. 26, 2023

(54) DIGITAL ASSET PRICE REGULATION SYSTEM USING DISTRIBUTED LEDGER TRANSACTION PROCESSING REWARDS

(71) Applicant: OptDyn, Inc., New Castle, DE (US)

(72) Inventors: Alev O. Karasulu, Brentwood, NY (US); Sally Khudairi, Wellesley, MA (US)

(73) Assignee: OptDyn, Inc., New Castle, DE (US)

( * ) Notice: Subject to any disclaimer, the term of this patent is extended or adjusted under 35 U.S.C. 154(b) by 0 days.

(21) Appl. No.: 16/996,643

(22) Filed: Aug. 18, 2020

(65) Prior Publication Data

US 2022/0058700 A1 Feb. 24, 2022

(51) Int. Cl.
  *G06Q 30/00* (2023.01)
  *G06Q 30/0283* (2023.01)
  *G06Q 30/018* (2023.01)
  *H04L 9/00* (2022.01)

(52) U.S. Cl.
  CPC ....... *G06Q 30/0283* (2013.01); *G06Q 30/018* (2013.01); *H04L 9/50* (2022.05)

(58) Field of Classification Search
  CPC ................. G06Q 30/0283; G06Q 30/018
  See application file for complete search history.

(56) References Cited

U.S. PATENT DOCUMENTS

| | | | |
|---|---|---|---|
| 10,540,654 B1 * | 1/2020 | James | G06Q 20/223 |
| 10,600,050 B1 * | 3/2020 | Anton | G06Q 20/02 |
| 11,468,431 B2 * | 10/2022 | Williams | A63F 13/792 |
| 2015/0170112 A1 * | 6/2015 | DeCastro | G06Q 20/381 |
| | | | 705/39 |
| 2017/0232300 A1 * | 8/2017 | Tran | H04L 67/535 |
| | | | 434/247 |

(Continued)

FOREIGN PATENT DOCUMENTS

WO WO-2019217367 A2 * 11/2019 ......... G06Q 20/3825

OTHER PUBLICATIONS

Panarello A, Tapas N, Merlino G, Longo F, Puliafito A. Blockchain and IoT Integration: A Systematic Survey. Sensors (Basel). 2018; 18(8):2575. Published Aug. 6, 2018 (Year: 2018).*

*Primary Examiner* — Rutao Wu
*Assistant Examiner* — Tyrone E Singletary
(74) *Attorney, Agent, or Firm* — Andrew Rapacke

(57) ABSTRACT

A system is provided for regulating the price of digital assets through work performed by a plurality of transaction processing (and/or validating) systems incented by rewards to participate on distributed ledgers such as blockchain networks. The system increases the demand for price regulated digital assets through an automated, tamperproof, hence mandatory conversion of a portion of digital assets received as work rewards for processing transactions in exchange for other digital assets targeted for price control. The system, composed of hardware and software, operates with or without intermediaries, where the reward is ultimately distributed to owners of said transaction processing systems. The system provides a means to control the price of digital assets to stabilize digital currencies, assist regulators to enforce anti-money laundering and tax evasion laws, while optionally providing price reductions using rebates to consumers and subsidies to manufacturers of distributed ledger transaction processing and/or validating systems.

8 Claims, 11 Drawing Sheets

(56) References Cited

U.S. PATENT DOCUMENTS

| | | | |
|---|---|---|---|
| 2019/0080402 A1* | 3/2019 | Molinari | G06Q 20/3672 |
| 2019/0095880 A1* | 3/2019 | Glover | G06F 16/1805 |
| 2019/0244207 A1* | 8/2019 | Samuel | G06Q 20/405 |
| 2019/0392511 A1* | 12/2019 | Mahajan | G06Q 20/02 |
| 2020/0012731 A1* | 1/2020 | Deshpande | H04L 9/3239 |
| 2020/0065899 A1* | 2/2020 | Fritsch | G06Q 30/0619 |
| 2020/0273048 A1* | 8/2020 | Andon | G06Q 20/045 |
| 2021/0294287 A1* | 9/2021 | Valin | H02S 10/10 |

* cited by examiner

DIGITAL ASSET PRICE REGULATION SYSTEM USING DISTRIBUTED LEDGER TRANSACTION PROCESSING REWARDS

FIELD OF THE INVENTION

The present invention is directed to the field of digital assets and their price regulation on markets through the action of a plurality of digital ledger systems and intermediaries incented by rewards to participate in transaction processing and/or validation mechanisms of digital ledger networks. In particular, the present invention's core relates to a means of transducing a rewarded digital asset into demand for digital assets targeted for price control. Optional features working in conjunction with the core of the invention are directed towards fields involving rebates for consumers of mining equipment and subsidies for manufacturers of mining equipment as well as methods for the enforcement of tax laws and the prevention of money laundering using digital assets.

BACKGROUND

Since January of 2009, after the first successful cryptocurrency network (Bitcoin) came online, several other cryptocurrencies, often referred to as "altcoins" (a portmanteau for alternatives to Bitcoin), emerged and with them came several problems. These cryptocurrencies being highly susceptible to speculation, without sound monetary policy, exhibited extreme volatility while creating severe money laundering and tax evasion loopholes. The challenges deter the use of distributed ledger technology (DLT) to solve common problems they would otherwise be ideally suited for and hinder innovation in the financial technology (FinTech) sector.

Most DLT networks, which include blockchain networks, use proof of work (PoW) algorithms in a consensus layer. The consensus layer allows a plurality of distributed peer nodes to coordinate agreement on the next set of transactions written to the ledger. In the case of blockchain ledgers, the next set of transactions are organized in read-only blocks linked permanently to each other with blocks analogous to pages being perpetually bound to a growing paper ledger. They use PoW algorithms involving hash calculations in the consensus mechanism to enable the system's characteristic trust-less operation and *Byzantine* Fault Tolerance. So long as no one entity on the network possesses more than 51% of the hashing power of the network the integrity of the ledger remains intact. To facilitate the healthy operation of the consensus layer, significant rewards are provided to incentivize a large distributed population of nodes in the network to compete against each other to produce the next block of transactions. This process of competing to find the next viable block of transactions to be attached to the end of the blockchain and collect the reward is referred to as "mining," and the ultra-high-performance machines doing the work (and their owners) competing against each other are referred to as "miners". The intense competition between miners to find the next block on the blockchain and collect a reward makes this process impossible for anyone to do without the use of high-performance machines.

The rewards are provided in the network's own cryptocurrency coins minted on demand and transferred to miner accounts. This process begets new coins as the only inflationary mechanism by which the money supply increases. Receipt of newly minted coins from the mining process is a form of taxable income, yet without the identities of those initially receiving the coins, the first owners in the chain of custody, mined coins are not easily tracible, hence income from mining is not readily taxable. Governments lose at least hundreds of millions of dollars of tax revenue each year as a result of not being able to tax miners. Anonymous miners also have the ability to use these coins to facilitate illicit transactions. Many illicit dark web activities such as purchasing illegal weapons, chemical substances, or enabling illicit activities are possible using untraceable cryptocurrencies. Many countries also use these untraceable cryptocurrencies to bypass sanctions. These real dangers to society have conditioned regulatory authorities to be extremely cautious and hesitant to approve the use of DLT and cryptocurrencies in legal commerce that could benefit most from it.

Still the biggest impediment for DLT adoption in the payment and settlement space results from price instability. Volatility discourages the use of cryptocurrencies as a viable medium of exchange. These undesirable aspects result from poor or overly simplistic monetary policies baked into the blockchain. Bitcoin clearly demonstrates volatility with wide price fluctuations. Volatility is a major inhibitor for the wide spread application of cryptocurrencies in FinTech, yet several macroeconomic principles could be leveraged to manage price instability if they were properly applied to cryptocurrencies.

One macroeconomic technique for currency price regulation involves the notion of liquidity, the degree to which pools of money are immediately available for exchange. Not all the money in the total money supply is equivalent in terms of liquidity. This is due to a large pool of money being illiquid when "tied up" in instruments which must mature before being used again to eventually cycle back into the pool of immediately liquid currency. The Money of Zero Maturity (MZM) represents the pool of completely liquid money in the total money supply. The MZM does not take into account illiquid money, often referred to as M3 money, held in maturing instruments like escrows or CDs which incur penalties for premature withdrawals. The U.S. Federal Reserve uses MZM data for directly gauging inflation since its velocity is a proven indicator impacting spending and consumption.

Methods and systems influencing the proportion of the MZM in relation to the total money supply directly regulates the price of the currency. The ratio of the MZM to the total money supply is a direct indicator of currency inflation or conversely its deflation. When the MZM decreases, meaning the supply of liquid money decreases, increased demand produces deflation. When the MZM increases, meaning the supply of liquid money increases, decreased demand produces inflation. Using these dynamics and the process of mining, valuable mined coins can be converted into others to draw them out of their MZM pool to regulate their price.

Unfortunately, the current state of the mining industry, due in part to mining equipment manufacturers, is resulting in havoc. Manufactures of mining equipment have no desire to create any sales friction through what would be deemed ethical practices. There's no effort put towards collaborating with regulators to curb criminal activity, nothing is being done to protect the impact to the environment, or prevent dangerous imbalances on ledgers by selling products primarily to centralized mining farms. Sales to farms rather than to individuals for better decentralization is especially dangerous since it reduces the integrity of distributed ledgers. Farms concentrate the hashing power (the work) in the hands of a few entities that can collude to conduct 51% attacks and intermediate transactions. These dynamics are a natural consequence of most individuals not possessing the buying power to purchase expensive mining equipment, whereas mining farms that already make large mining profits do have the buying power.

No prior art approaches have provided solutions to these problems by leveraging mining equipment and the rewards they produce. Thus, the known prior art is not suited to solve the problems underlying the present invention in a practically acceptable manner. Thus, a solution to the above problems and drawbacks is still need.

BRIEF SUMMARY OF THE INVENTION

In one or more embodiments of the invention, a system regulating the price of digital assets through work performed by a plurality of high-performance cryptocurrency mining systems incented by rewards to participate on distributed ledgers such as blockchain networks is disclosed. The system increases the demand for price regulated cryptocurrencies such as coins or tokens through an automated, tamperproof, hence mandatory conversion of a portion of coins such as Bitcoin, Litecoin or Ether etc. received as mining rewards in exchange for price regulated tokens or coins. The system, composed of hardware and software, operates with or without intermediaries, where rewards are ultimately distributed to the owners of miners. The system provides a means to control the price of digital currencies while providing optional features comprising:

(a) assisting regulators in enforcing anti-money laundering and tax evasion laws, and (b) providing rebates to consumers of cryptocurrency mining products, and (c) providing subsidies to manufacturers of cryptocurrency mining products.

The proposed system of price regulation "pumps" liquid money (the digital asset targeted for price control) from the its MZM monetary pool into the M3 pool to produce deflationary pressure. A conversion step, exchanging a portion of mined coins for price regulated digital assets, is regulated through control parameters (such as the amount— as in the percentage of mined coins to convert) and is applied by tamperproof logic within mining hardware and/or in intermediaries. In aggregate, conversions across the plurality of miners and/or intermediaries produces demand for the liquid forms of the digital asset targeted for price control which impacts its price. The conversion or steps there after leave the digital asset targeted for price control within instruments or in a state that effectively makes them illiquid requiring a penalty to convert back into their full liquid state in the MZM pool. This subprocess regulates the forward flow of the digital asset targeted for price control across the MZM monetary pool into the M3 pool. Because of the nature of cryptocurrency mining, no human, or any population of humans would in their lifetime be able to conduct mining operations manually. Even if it were possible in thousands of years to produce a single mined coin with manual operations it would not induce any significant price influencing deflationary pressure. Furthermore, a human only process could not be easily made tamper proof.

The tamper proof and mandatory conversion of mined cryptocurrencies into the digital asset targeted for price control produces enough forward pressure and forward flow from the MZM to M3 pool. The forward flow due to the conversion means could easily reverse direction to flow immediately back into the MZM pool. In such a situation, there would be no net price impact to the price controlled digital asset. Incentivization via rewards or discouragement via penalties for individuals converting back their illiquid funds into liquid funds slows down this immediate reversal. Individuals think twice before getting penalized with a portion of the population deciding to wait for maturity and another prematurely liquidating it. In aggregate, the overall actions of the population results in lesser backflow. Thus, the key to impacting the price of the digital asset targeted for price control is to produce a net flux between the two monetary pools. Regulating these two counteracting forces manages the forward and backward flows which work in tandem to regulate the price of the digital currency.

In further preferred embodiments, a discouraging penalty for premature liquidation, such as a liquidity premium and maturation period (with respective control parameters) regulate the penalties imposed for premature utilization of immature funds along with the time required for maturation: the time period tying up those funds in the M3 pool to limit backflow. Together, these parameters regulate the amount of inflationary back pressure (M3->MZM) of maturing money counteracting the deflationary forward pressure (MZM->M3). As mentioned, the overall flux between liquid and illiquid funds then determine the price of the currency. See FIG. 11, a non-embodiment graphic, intended for informational purposes to depict the concept of MZM/M3 flux.

In further preferred embodiments, the implementation of the backflow pressure control means may for example be based on a liquidity premium comprised of tamperproof logic directly incorporated into the token smart contract or blockchain code of coins. This tamperproof logic integrated into the token related smart contracts and/or the blockchain software stack would mandate the maturity requirement on transfers to the accounts of other parties.

In further preferred embodiments, the implementation of the backflow pressure control means may for example be based on a liquidity premium comprised of logic incorporated into tamperproof escrow based smart contracts that are separate and independent of the token contract or the blockchain code. In this case, the tamperproof logic in the escrow contract mandates the maturity requirement with a step requiring the owner to withdraw the digital asset from an escrow contract to their own account address.

Conversely in further embodiments, the liquidity premium may reward for mature use or withdrawal rather than using penalties for immature use or withdrawal. Both tactics could even be used together. Regardless of the means, the same ultimate intended impact of retarding back flow will occur.

In further preferred embodiments, the penalty for premature use of funds in the digital asset targeted for price control could be destroyed (burned) or transferred to accounts associated with other activities (i.e. rebates and subsidies). Burning the forfeited penalty amount of the digital asset targeted for price control helps reduce the overall money supply which causes deflation to occur.

In further preferred embodiments, intermediaries may intercede to pool work performed by mining equipment and/or handle conversions before forwarding rewards to miners. In such cases, mining equipment may need post-manufacturing configurations including a process of reconciliation upon delivery to the consumer. For example, a hybrid mining pool may handle both pooling and conversion in one step then distribute rewards along with the converted digital assets targeted for price control. Furthermore, distribution may entail transferring the digital asset targeted for price control to an escrow smart contract address or to the miner's account address.

In further preferred embodiments, a regulatory body publishes the parameters controlling the amount of conversion, and the liquidity premium along with the period of maturation. These parameters may be published using any combination of technologies including directly publishing them on the blockchain with smart contracts, via web services and/or via messaging technologies so that all elements in the system can lookup and/or be notified of changes to control parameters to modify their operation appropriately.

In further preferred embodiments, the ability to influence the price of a digital asset is used to provide rebates for consumers of mining equipment, as well as subsidies for manufacturers of such equipment. The invention's core price regulation capability provides the foundation for both consumer rebates and manufacturer subsidies. By adjusting all parameters to favor a steep rise in the price of the regulated digital asset during cycles of mining equipment sales, the positive difference in price between the time users buy and receive their purchased mining equipment results in considerable value generation. The value generated by the difference in price facilitates significant rebates for consumers and subsidies to manufacturers. This additional feature enables individuals lacking the buying power of mining farms to purchase high performance mining equipment at lower prices with some possibly getting the equipment for free or for a profit. Rebate reward consumers for their wait as mining equipment is manufactured especially in pre-sales events. It also helps buffer manufacturers against price volatility while acquiring components for manufacturing through their supply chain which in turn helps establish cheaper more realistic pre-sale prices. Consumers of mining equipment are incentivized to partake in the conversion process powering the invention's core price regulation capability when they participate in rebate program. When consumers accept the rebate, their mining equipment is configured to enable mandatory conversion. Likewise, applying for subsidies from this process helps mining equipment manufacturers implement the needed system integration with this invention whereby prices are kept low to enable more mass consumption.

In further preferred embodiments, optional steps may be included to facilitate the reporting of income and capital gains from the activity of mining for both cryptocurrency rewards and converted digital assets targeted for price control. When combined with identity information from the sale of the mining equipment and/or through KYC/AML procedures, the first owner in the chain of custody of the cryptocurrency is determined. Tracking the chain of custody of cryptocurrencies originating from mining rewards are then possible which in turn assists in the enforcement of income tax and capital gains tax laws. Up until now the income from the activity of mining was not readily taxable or traceable since the first owner was unclear. Subsequent trading through exchanges requiring KYC/AML helps establish the identity but this is not always possible. Having the first owner in the chain of custody helps detect illicit transactions using the mined cryptocurrencies and digital assets targeted for price control.

Additional objects, features, and advantages of the present invention will be more readily apparent from the following detailed descriptions of the same preferred embodiments thereof. The present invention is not limited in its application, details, or components merely to those set forth in the following description and illustrations. The present invention resides not merely in any one of the features set forth in this specification, but also in the particular combination of one or more of the features and improvements claimed.

Methods and devices consistent with the present invention are capable of other embodiments. In general, the order of the steps of disclosed processes may be altered within the scope of the invention. Also, the phraseology and terminology employed herein are for the purpose of description and should not be regarded as limiting unless explicitly stated as such.

BRIEF DESCRIPTION OF THE DRAWINGS

Some embodiments of the present invention are illustrated as an example and are not limited by the figures of the accompanying drawings, in which like references may indicate similar elements and in which:

FIGS. 1-6 are process flow diagrams that also depict the data flow of digital assets through the action of process steps performed by system entities of various embodiments. All FIGS. 1-6 consistently refer to the same digital assets rewarded for work performed by ledger systems as $R_w$ (R subscript W, as in Reward for Work) and C for the converted digital asset targeted for price control. FIGS. 1-6 are a subset of figures specifically intended to depict different embodiments of the system's core price regulation capability without including optional features of the invention for consumer rebates, manufacturer subsidies, or regulatory compliance.

Figure 1:
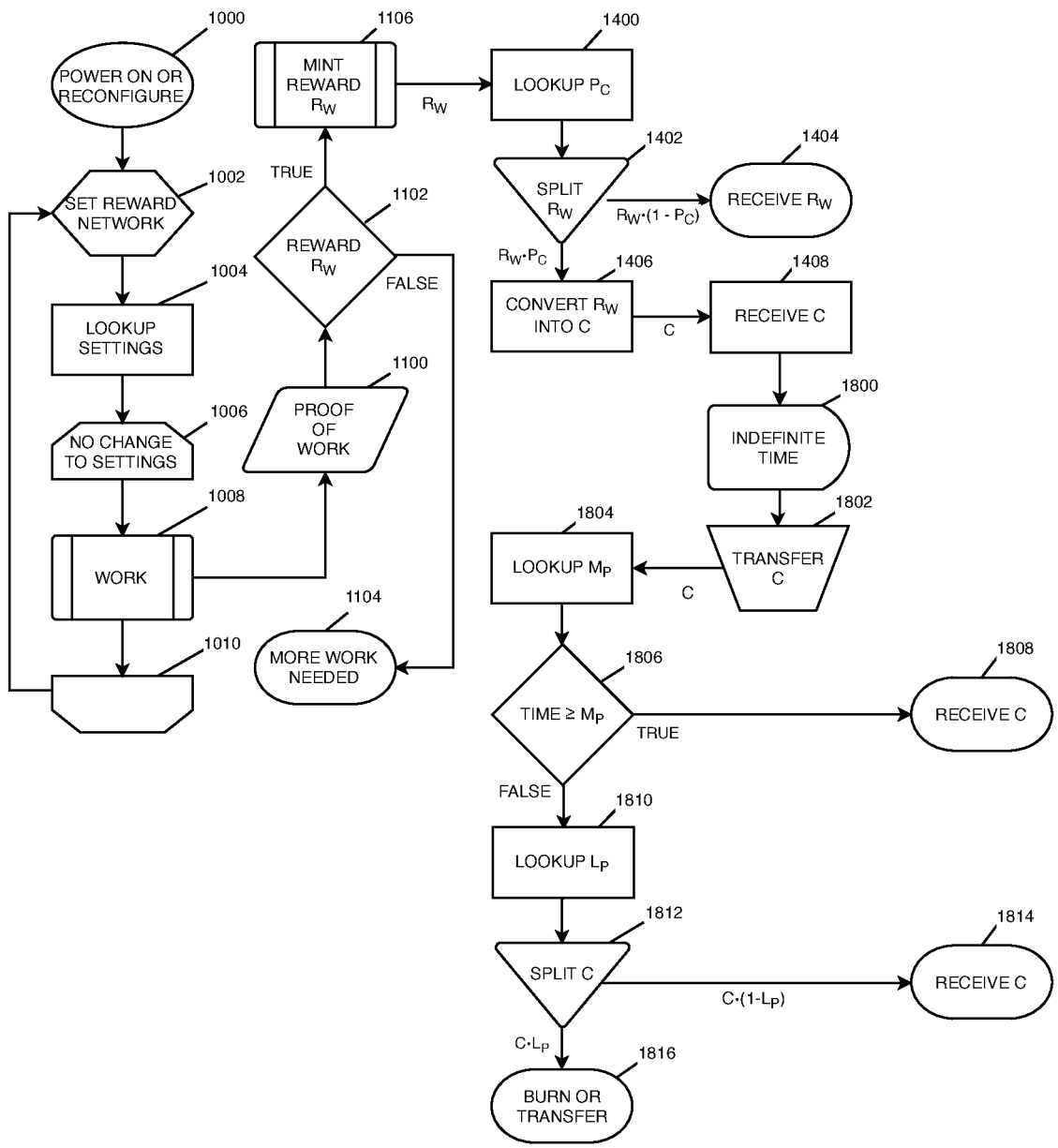
FIGS. 1-10 are process flow diagrams associated with embodiments.
Figure 2:
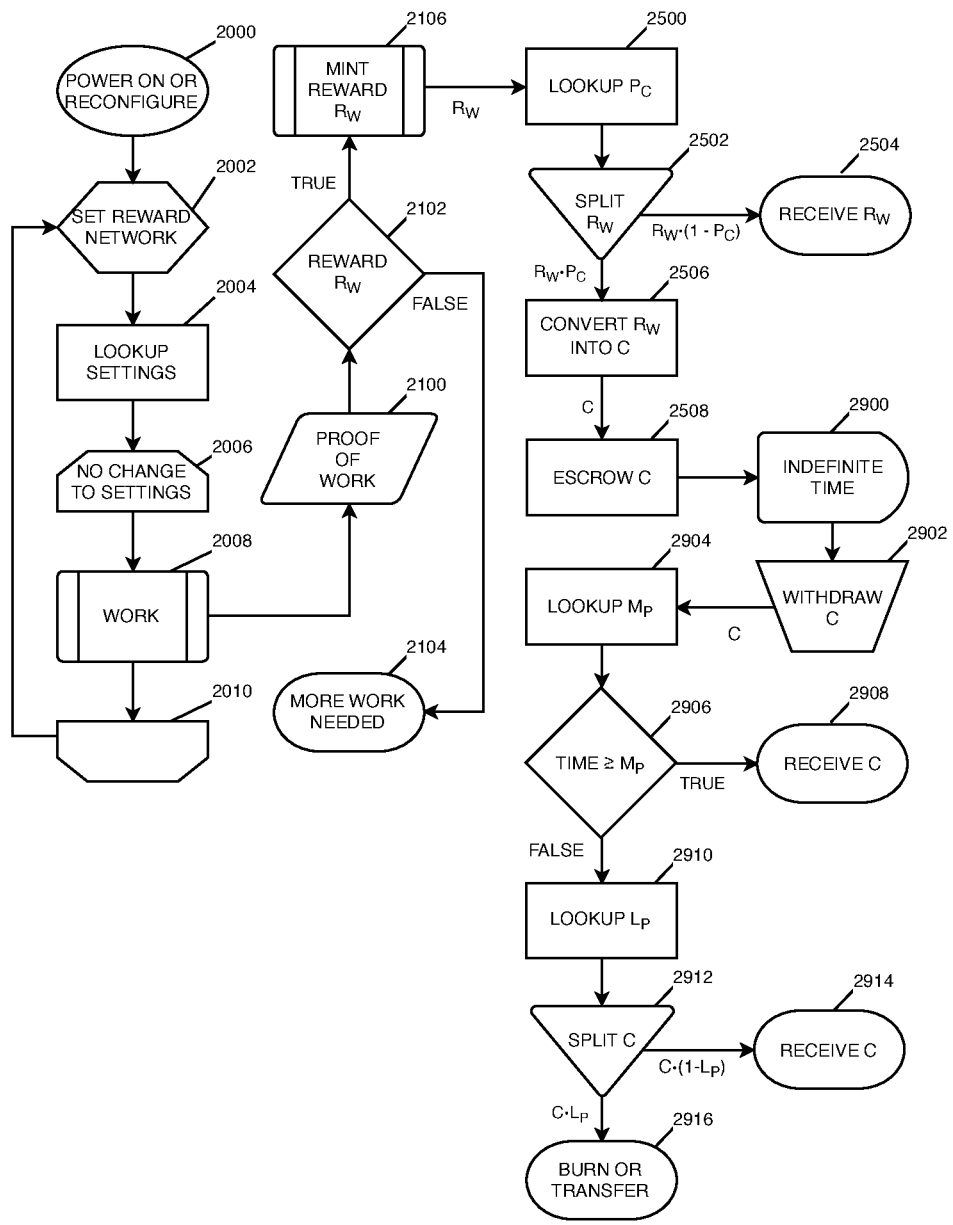
Figure 3:
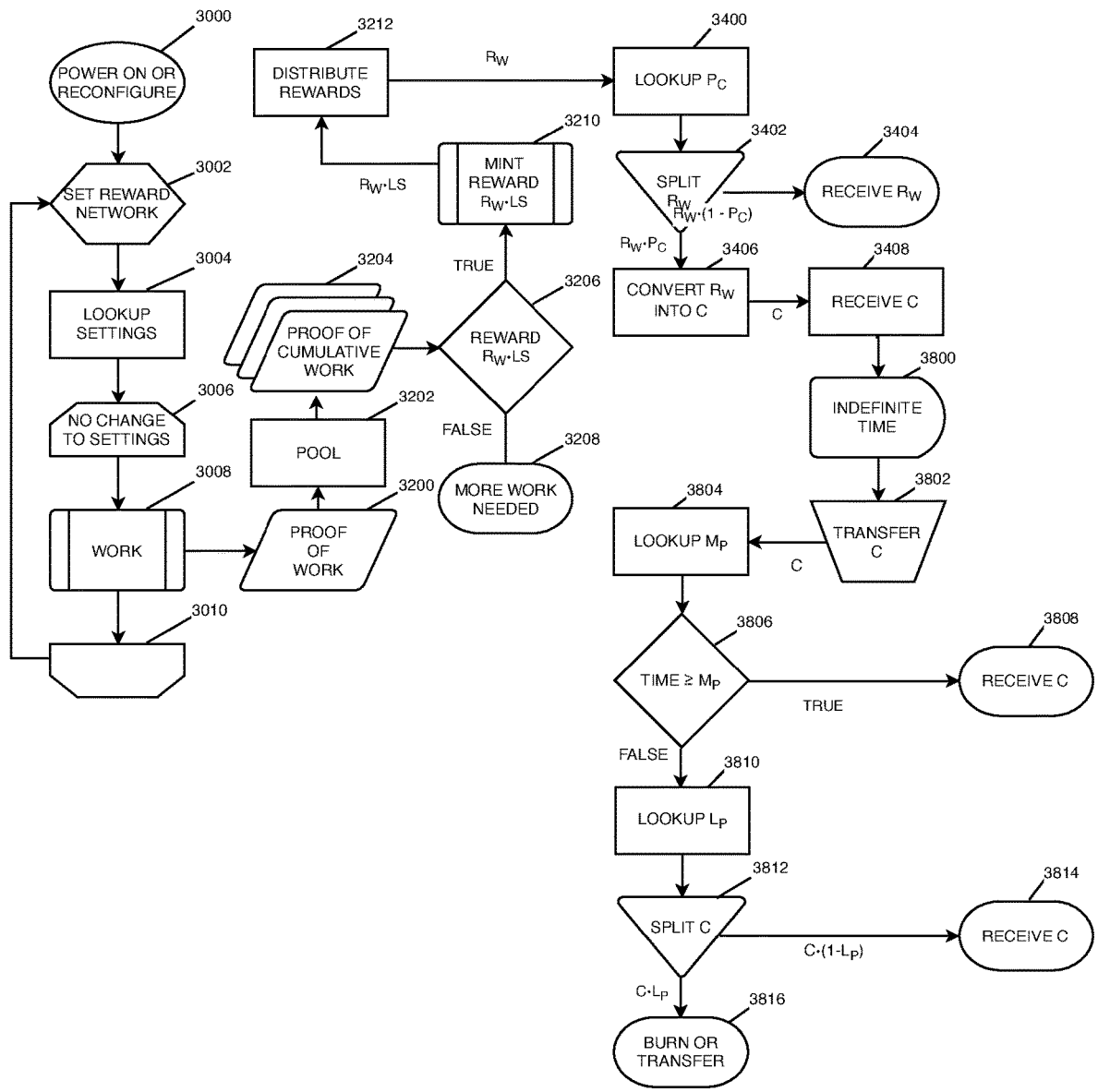
Figure 4:
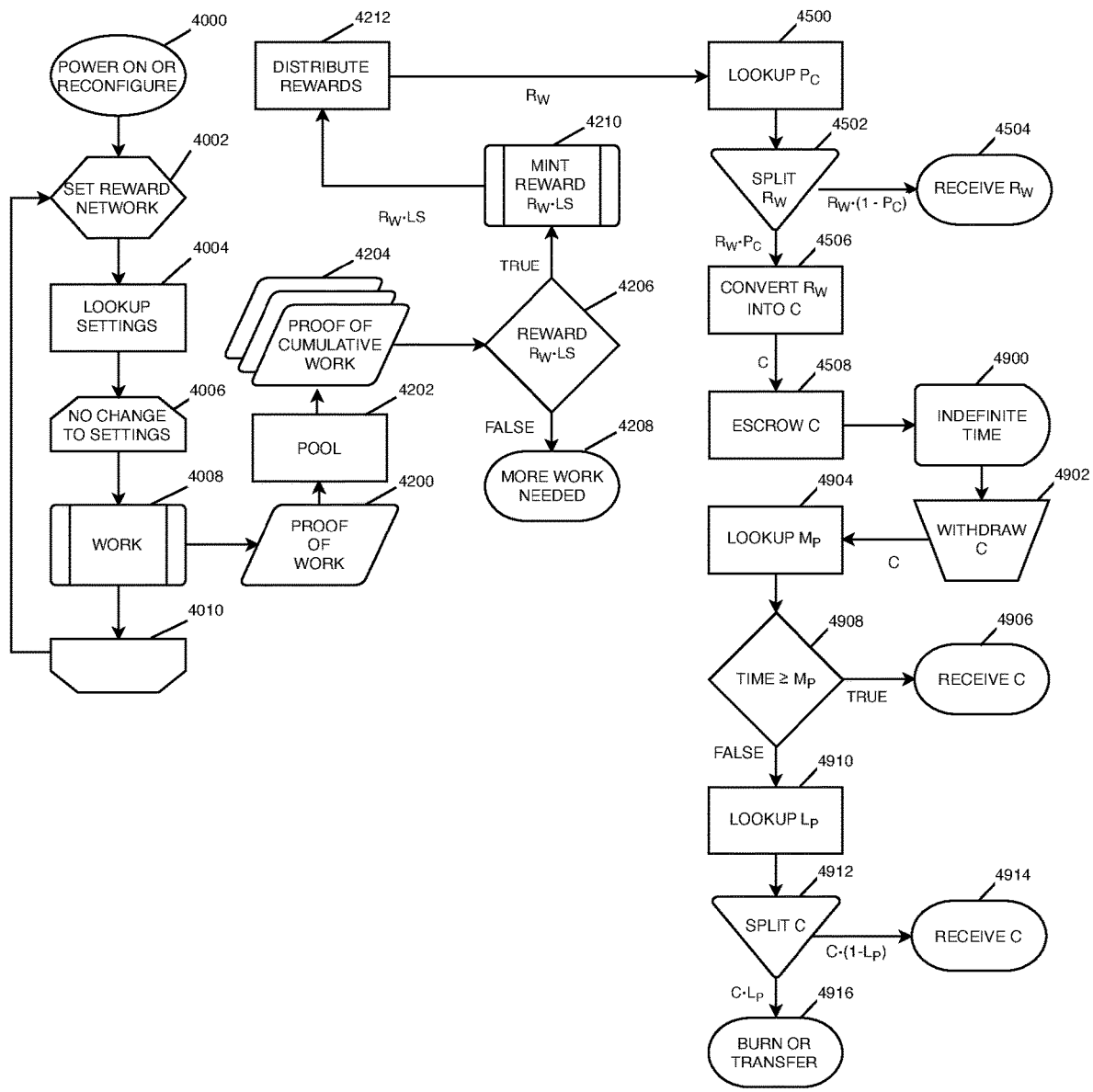
Figure 5:
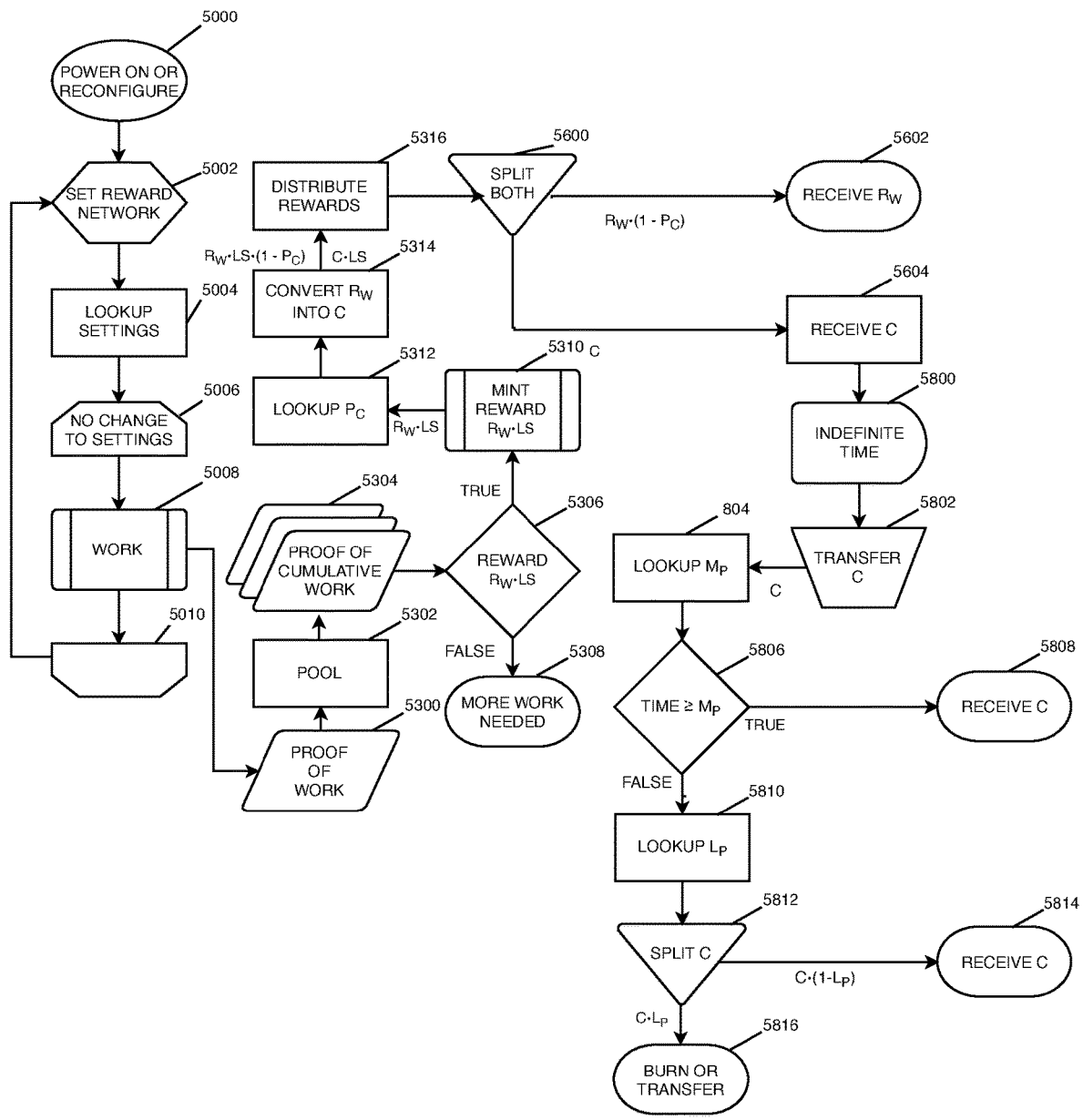
Figure 6:
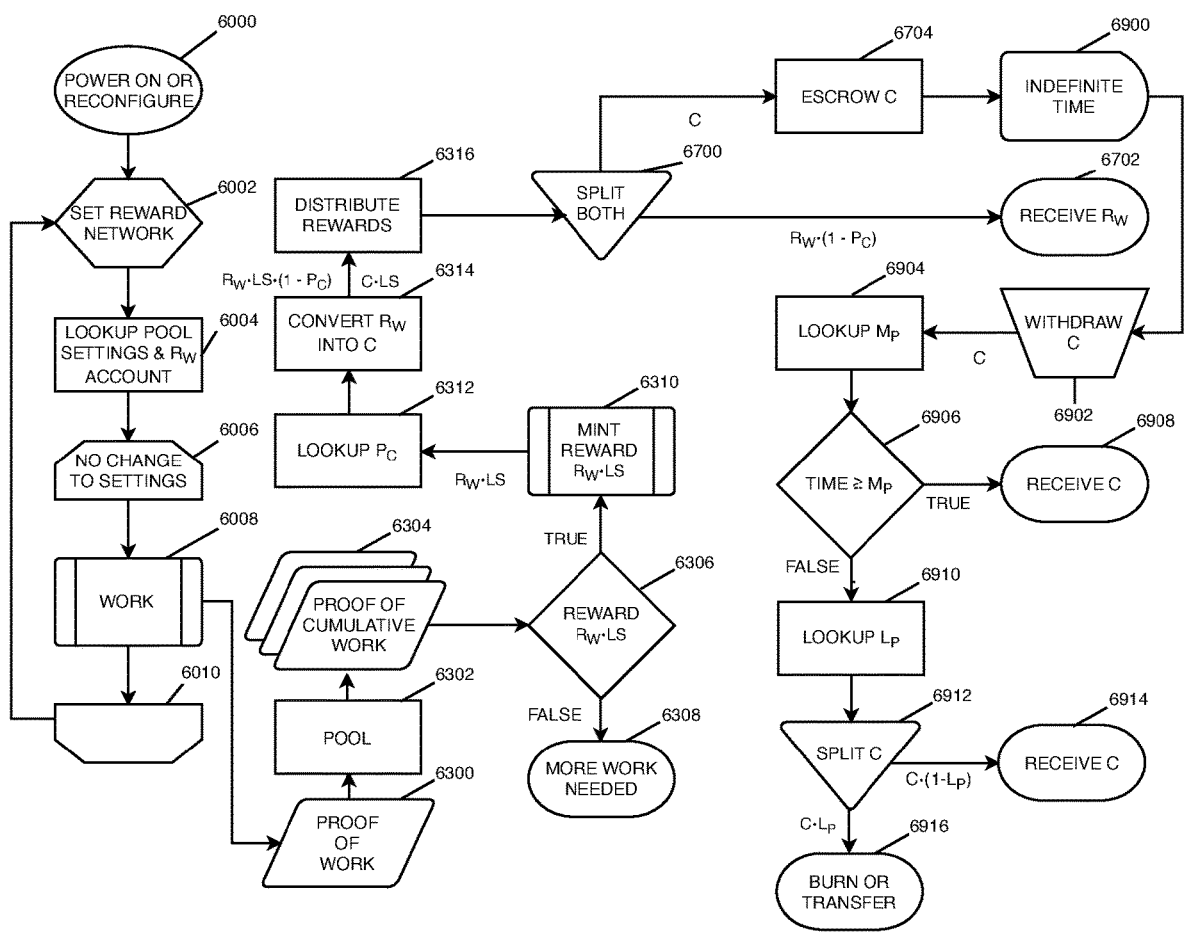

Process elements in FIGS. 1-6 are labeled using a numbering scheme of 4-digits. The arithmetic value of the 4-digit number always increases with process step progression except at branch points. The first digit corresponds to the figure number i.e. entities in the 5000 range for FIG. 5. The second digit corresponds to a subprocess number of which there are 10 subprocesses in total with the first being subprocess 0 and the last subprocess 9. The last two digits are unique subprocess entity identifiers which are all incremented using even numbers. This numbering scheme was used to avoid describing the same subprocesses more than twice since many of the subprocesses do reoccur across figures. The subprocesses may later (in a non-provisional application) be broken down into their own independent figures, however for the time being it was decided that seeing the core process in its entirety on a single figure and page was easier for comprehension. The subprocesses with number assignments comprise:

(0) subprocess 0 with 6 entities, numbered [000-010] inclusive, present in FIGS. 1-6, representing the actions of the digital ledger processing and/or validating system receiving rewards (referred to as "the mining hardware", or "ledger system"), and (1) subprocess 1 with 4 entities, numbered [100-106] inclusive, present in FIGS. 1 and 2, representing the actions taken for direct DLT network interactions to disclose the work performed while processing and/or validating transactions, and (2) subprocess 2 with 7 entities, numbered [200-212] inclusive, present in FIGS. 3 and 4, representing the actions taken for indirect DLT network interactions via a work aggregating mining pool to disclose the work performed while processing and/or validating transactions, and (3) subprocess 3 with 9 entities, numbered [300-316] inclusive, present in FIGS. 5 and 6, representing the actions taken for indirect DLT network interactions via a hybrid work aggregating and reward converting mining pool to disclose the work performed while processing and/or validating transactions, and (4) subprocess 4 with 5 entities, numbered [400-408] inclusive, present in FIGS. 1 and 3, representing the actions taken to interface both directly and indirectly with DLT networks via intermediary pools connecting them to the subprocess embodiment for incentives and/or penalties for premature liquidation to be enacted on transfers with logic embedded into the DLT stack, and/or smart contracts associated with tokens, and (5) subprocess 5 with 5 entities, numbered [500-508] inclusive, present in FIGS. 2 and 4, representing the actions taken to interface both directly and indirectly with DLT networks via intermediary pools connecting them to an alternative subprocess embodiment for incentives and/or penalties for premature liquidations to be enacted on withdrawals with logic embedded into an escrow smart contract, and (6) subprocess 6 with 3 entities, numbered [600-604] inclusive, present in FIG. 5 only, representing the actions taken to interface indirectly with DLT networks via a hybrid work aggregating and converting pool connecting it to the subprocess embodiment for incentives and/or penalties for premature liquidation to be enacted on transfers with logic embedded into the DLT stack, and/or smart contracts associated with tokens, and (7) subprocess 7 with 3 entities, numbered [700-704] inclusive, present in FIG. 6 only, representing the actions taken to interface indirectly with DLT networks via a hybrid work aggregating and converting pool connecting it to the subprocess embodiment for incentives and/or penalties for premature liquidation to be enacted on withdrawals with logic embedded into an escrow smart contract, and (8) subprocess 8 with 9 entities, numbered [800-816] inclusive, present in FIGS. 1, 3, and 5, representing the actions taken by users and a DLT and/or token code based embodiment to implement incentives and/or penalties for premature liquidation enacted on transfers, and (9) subprocess 9 with 9 entities, numbered [900-916] inclusive, present in FIGS. 2, 4, and 6, representing the actions taken by users and an escrow smart contract based embodiment to implement incentives and/or penalties for premature liquidations enacted on withdrawals.

FIGS. 7-10—Are a subset of the figures specifically intended to depict different embodiments of the system's optional features for regulatory authority control, consumer rebates, manufacturer subsidies, regulatory compliance (taxes and anti-money laundering), and factory configuration and purchase reconciliation processes.

FIG. 1—FIG. 1 depicts the process flow and digital asset flow across components of an embodiment where the mining hardware performs work directly on reward providing distributed ledgers, and liquidity management logic is present within a token smart contract or the software stack of the same or another distributed ledger.

FIG. 2—FIG. 2 illustrates a modified version of the embodiment in FIG. 1 which uses an escrow-based mechanism for liquidity management such as via an independent smart contract rather than embedding liquidity regulation logic directly into a token's smart contract or the blockchain's software stack.

FIG. 3—FIG. 3 depicts the process flow and digital asset flow across components of an embodiment where the mining hardware performs work indirectly on reward providing distributed ledgers through the intermediation of mining pools, and liquidity management logic is present within a token smart contract or the software stack of the same or another distributed ledger.

FIG. 4—FIG. 4 illustrates a modified version of the embodiment in FIG. 3 which uses an escrow-based mechanism for liquidity management such as via an independent smart contract rather than embedding liquidity regulation logic directly into a token's smart contract or the blockchain's software stack.

FIG. 5—FIG. 5 depicts the process flow and digital asset flow across components of an embodiment where the mining hardware performs work indirectly on reward providing distributed ledgers through hybrid intermediaries acting as both mining pools and reward converters, and liquidity management logic is present within a token smart contract or the software stack of the same or another distributed ledger.

FIG. 6—FIG. 6 illustrates a modified version of the embodiment in FIG. 5 which uses an escrow-based mechanism for liquidity management such as via an independent smart contract rather than embedding liquidity regulation logic directly into a token's smart contract or the blockchain's software stack.

Figure 7:
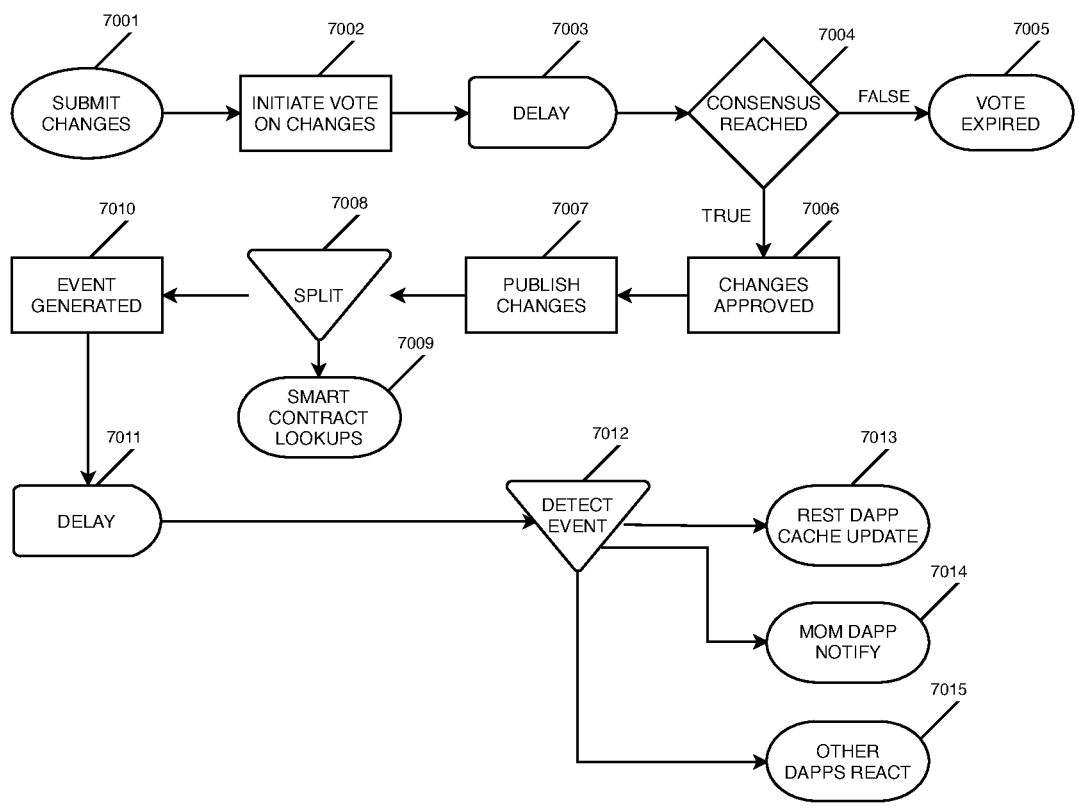

FIG. 7—FIG. 7 illustrates a regulatory authority control parameter management and publishing embodiment.

Figure 8:
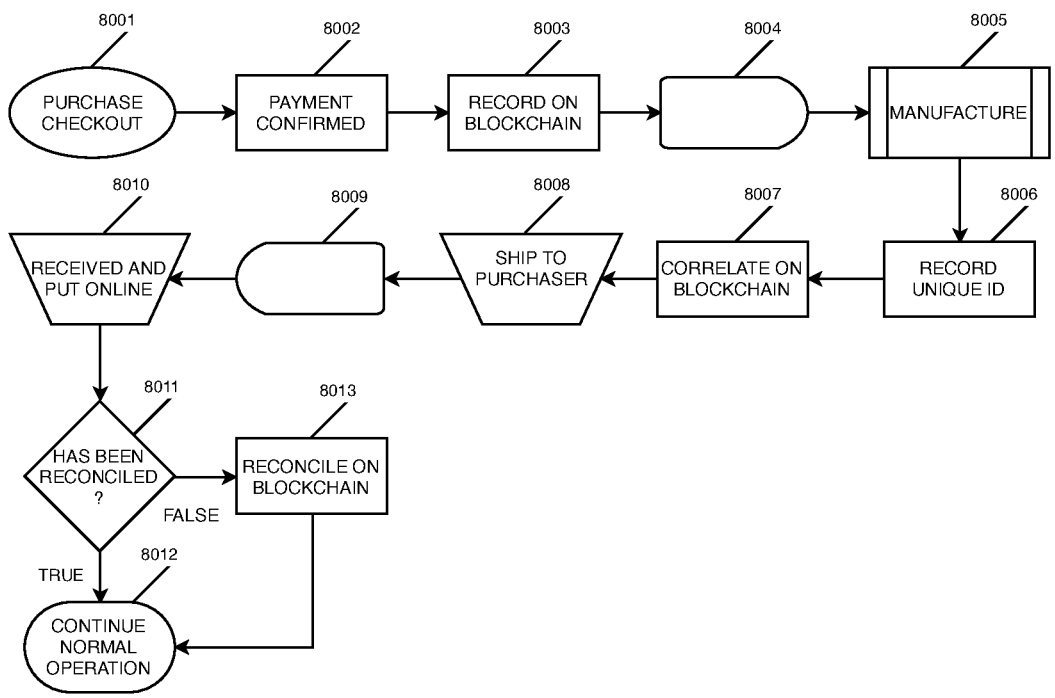

FIG. 8—FIG. 8 shows a factory configuration and purchase reconciliation process embodiment.

Figure 9:
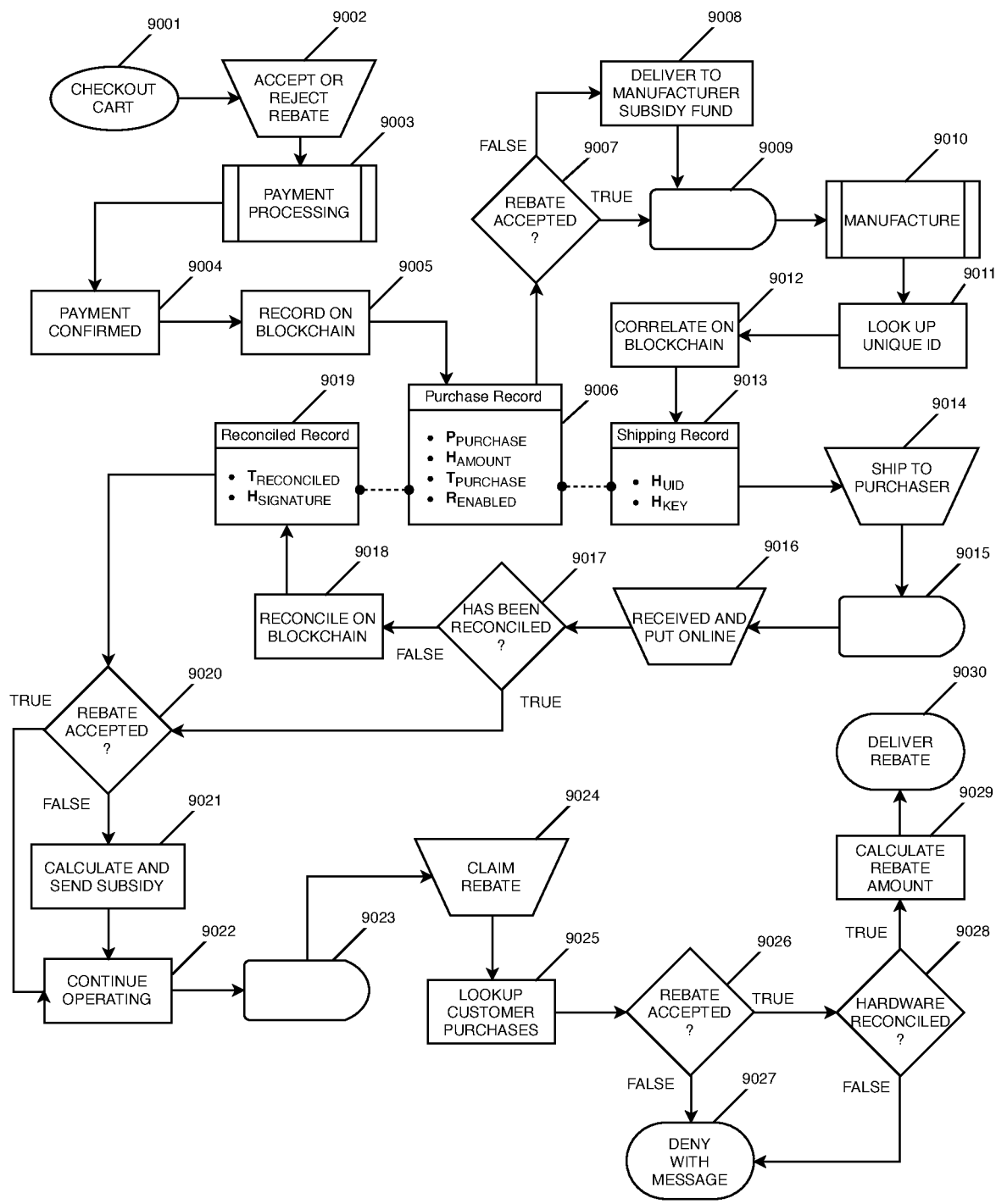

FIG. 9—FIG. 9 depicts an embodiment of the consumer rebate feature combined with an embodiment of the manufacturer subsidy assistance feature.

Figure 10:
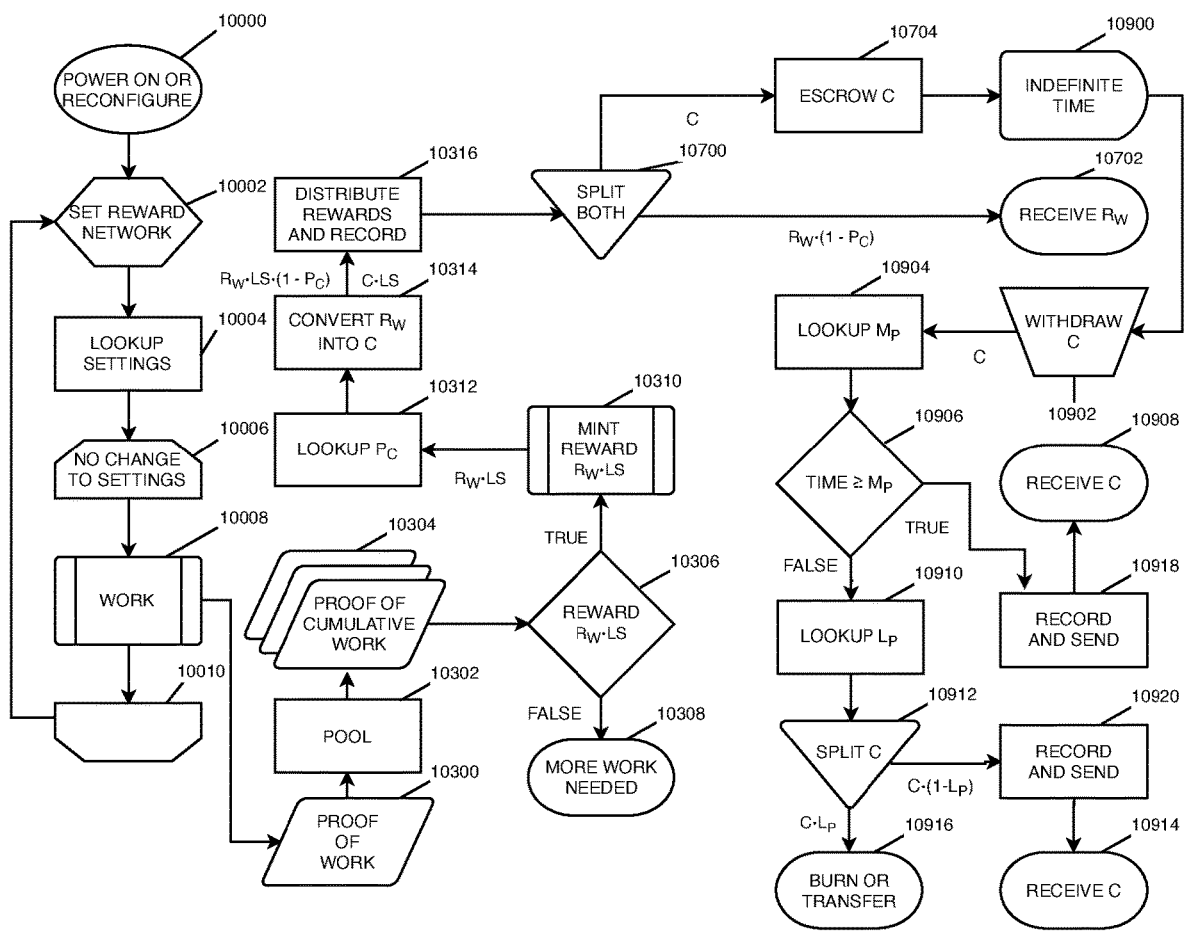

FIG. 10—FIG. 10 depicts an embodiment of the feature used to track the first owner in the chain of possession of mined rewards in addition to the digital assets targeted for price control for the purposes of taxation and regulatory compliance.

Figure 11:
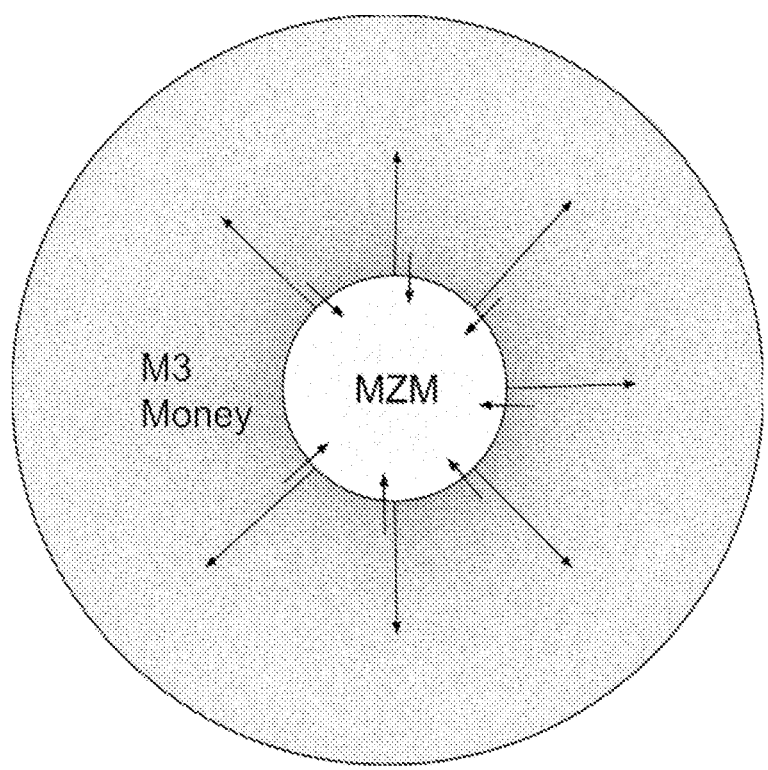

FIG. 11—FIG. 11 is not an illustration intended for depicting any embodiments but rather serves as an aid to the background section for conveying the MZM flux concept which influences the price of the regulated digital asset.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical, scientific, and economic terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new system for regulating the price of a digital asset on markets by leveraging the value of other digital assets rewarded for performing work to process and/or validate transactions on various distributed ledger networks and its additional features are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing preferred embodiments. Subprocesses that reoccur will only be explained once with back references provided to paragraphs containing their detailed descriptions.

FIG. 1 is a process flow diagram with annotations showing digital asset flows comprised of subprocesses 0, 1, 4, and 8. FIG. 1 depicts an embodiment of the invention wherein a plurality of miners interact directly with a DLT network's PoW consensus layer to collect coin rewards for the work they perform. The rewarded coins are forwarded to a specified network address which exchanges a portion of the rewarded coins for price-controlled digital assets. The mandatory conversion occurs when consumers of the mining equipment opted for participating in the rebate program upon purchase of the mining equipment. The digital assets may represent tokens backed by smart contracts or coins with code for them embedded into the software stack of yet another DLT. The DLT being mined may or may not be the same as the DLT associated with the digital assets targeted for price control. The logic for applying penalties upon premature transfer of digital assets targeted for price control is embedded within the respective token or coin code.

Subprocess 0 present in all FIGS. 1-6, represents the setup and perpetual operation of the tamper proof mining system. 1000 of FIG. 1 (subprocess 0, entity 00) depicts the miner being manually started or reconfigured for example to start mining on a different network. The miner prepares parameters to mine on the specified network in 1002 of FIG. 1 (subprocess 0, entity 02). Before it starts mining in 1006 of FIG. 1, it performs a lookup to find the unique account associated with itself in 1004 of FIG. 1 (subprocess 0, entity 04). Other parameters such as device settings may also be looked up. Once the lookup completes, miners provide the looked-up account address with other information to the DLT while presenting proof of work. Ultimately the DLT sends mining rewards to that address. 1004 of FIG. 1 may use a designated webservice or even a smart contract method call on the blockchain to lookup the address associated with itself. To do so, the mining equipment provides, as an argument, a unique identifier associated with itself through the manufacturing process. See FIG. 10 for an embodiment of the manufacturing and reconciliation of the miner which creates and records this machine's unique identifier. 1006 (subprocess 0, entity 06) and 1010 (subprocess 0, entity 10) represent the ends of a loop which is only interrupted by manual user setting changes (changing the rewarding DLT mined) or by powering off the machine (power off terminal node not shown for brevity). 1008 of FIG. 1 (subprocess 0, entity 08) represents the miner's continuous operation in performing work which is used to provide proof of work to the DLT network with messages. Descriptions of this same subprocess 0 embedded within FIGS. 2-6 inclusive will refer back to this paragraph rather than repeating it for brevity.

Subprocess 1 present in FIGS. 1, 2 and 6, represents the DLT providing rewards to the miner. 1100 in FIG. 1. (subprocess 1, entity 00) represents the contents of the message sent to the DLT network to present proof of work. 1102 in FIG. 1 (subprocess 1, entity 02), a branching decision node, determines if the proof of work provided warrants a reward designated by $R_W$ (Reward subscript Work). If the branch condition evaluates to FALSE, more work is needed and the subprocess terminates in terminal node 1104 of FIG. 1 (subprocess 1, entity 04) further awaiting additional work messages. If the branch condition evaluates to TRUE, the subprocess transitions to 1106 of FIG. 1 (subprocess 1, entity 06) where the reward is minted and delivered to the account address. Descriptions of subprocess 1 contained in FIGS. 2 and 4 will refer back to this paragraph rather than replicating it.

Subprocess 4 present in FIG. 1, and 4, represents the action of a conversion intermediary used to exchange a part of the reward into the digital asset targeted for price control. Upon receiving the reward at the specified account address (looked up in subprocess 0, entity 04) specific to the miner hardware, the intermediary looks up the amount to convert in 1400 in FIG. 1 (subprocess 4, entity 00). The $P_C$ (Percent subscript Converted) parameter is made available through potentially several means by a regulatory authority responsible for price regulation. The lookup therefore uses one of these means to determine how much of the reward to convert. The part of the reward, $R_W \cdot (1-P_C)$, which is not to be converted, is split into a parallel path in 1402 of FIG. 1 (subprocess 4, entity 02) and sent to the miner owners' wallet account for the rewarded coin. Note the miner owners' wallet account for R rewards, and its address is not the same account address used by the miner to inform the DLT of where to send mining rewards. This parallel path terminates immediately after delivering the rewards to the miner owners' wallet account for, C, the price Controlled digital asset. The second part of the reward, $R_W \cdot P_C$, is split into the second parallel path in 1402 of FIG. 1 (subprocess 4, entity 02) and converted in 1406 of FIG. 1 (subprocess 4, entity 06). The means of conversion may involve the use of a third-party exchange or the intermediary associated with this subprocess is itself an exchange. The converted quantity, C, is transferred to the owners' wallet account associated with the DLT network of, C, the digital asset targeted for price control.

Both paths of subprocess 4 effectively terminate: hard termination with a terminal node on 1404 of FIG. 1 (subprocess 4, entity 04) with soft termination on 1408 of FIG. 1 (subprocess 4, entity 08). The termination is "soft" because it stops, indefinitely awaiting a transfer event to continue the overall process of FIG. 1. Thus, the entire process still continues with manual user actions to transfer, C, the digital asset targeted for price control.

Subprocess 8 present in FIGS. 1, 3, and 5, represents the actions of code in the smart contract of a token or the embedded code of a coin in a DLT software stack to implement premature transfer penalties. Subprocess 8 starts with an indefinite delay in 1800 of FIG. 1 (subprocess 8, entity 00) representing the wait time before a manual transfer event in 1802 of FIG. 1 (subprocess 8, entity 02) triggers transfer checking code further downstream in the process. The transfer operation code must look up the maturation time, $M_P$, in 1804 of FIG. 1 (subprocess 8, entity 04). One of several lookup or notification means offered by the regulatory authority could be used in this step or prior to it to cache this value locally. Nevertheless, $M_P$ must be looked up from somewhere to check if the transfer results in mature liquidation in 1806 of FIG. 1 (subprocess 8, entity 6). If the transfer occurs after $M_P$ days, that is after maturation of C tokens or coins, then all the C converted in earlier subprocesses are transferred to the destination account address the owner was attempting to transfer C to. If the transfer occurs before $M_P$ days, that is before maturation of C tokens or coins, then a look up of the liquidity premium penalty, $L_P$, is required to determine the penalty for premature transfers in 1810 of FIG. 1 (subprocess 8, entity 10). Like the $M_P$ parameter, the $L_P$ parameter can also be looked up through multiple means offered by the regulatory authority. Once the liquidity premium is determined the code calculates the amount of the immature digital asset to transfer, $C \cdot (1-L_P)$, in 1812 of FIG. 1 (subprocess 8, entity 12). The two parallel process paths terminate with one sending $C \cdot (1-L_P)$ of immature tokens, to the destination account's address in 1814 of FIG. 1 (subprocess 8, entity 14) and one sending $C \cdot L_P$ to another address or burning it in 1816 of FIG. 1 (subprocess 8, entity 16). Minor details pertaining to the algorithm used in the aging of tokens and transfers are omitted: such as using mature tokens, $C \cdot L_P$, to fill in the missing amount associated with the transfer to the destination address. If $C \cdot L_P$ mature tokens are not available then the transfer might be aborted since the intention was to transfer a quantity C to the destination. Nevertheless, these are all minor details that are sufficiently clear to implementors within the art to contend with so they do not require definition for the sake of brevity.

FIG. 2 is a process flow diagram with annotations showing digital asset flows comprised of subprocesses 0, 1, 5, and 9. FIG. 2 depicts an embodiment of the invention that uses an escrow smart contract to mature C tokens or coins requiring penalties, if any, to be settled on a withdrawal operations rather than on transfer operations to other destinations. FIG. 2 and FIG. 1 both contain subprocesses 0 and 1. Entities 1000-1010 of FIG. 1 and 2000-2010 of FIG. 2 map to subprocess 0 and are exactly the same. Entities 1100-1106 of FIG. 1 and 2100-2106 of FIG. 2 map to subprocess 1 and are exactly the same. Please see paragraphs 46 and 47 respectively for detailed descriptions of subprocesses 0 and 1 respectively.

Subprocess 5 in FIG. 2 represents the actions of a converting intermediary which rather than sending C to the wallet account address of the owner, instead sends them to an escrow account to later be withdrawn by the owner. The rewards, $R_W$, are transferred to the intermediary's smart contract by the DLT in 2106 of FIG. 2 (subprocess 1, entity 06) which immediately looks up the percentage to convert, $P_C$, in 2500 of FIG. 2 (subprocess 5, entity 00). $P_C$ is looked up, just as before, from the regulatory authority (or from a cached value) via one of the means of access offered by the regulatory authority. The process then splits into two parallel paths in 2502. One path transfers the non-converted amount of the reward, $R_W \cdot (1-P_C)$, to the owners' account address in terminal node 2504 of FIG. 2 (subprocess 5, entity 04) and terminates. The other path converts, $R_W \cdot P_C$, of the rewarded coin into, C, the digital access targeted for price control in 2506 of FIG. 2 (subprocess 5, entity 06). The converted C tokens or coins are "deposited" into an escrow account by transferring C to the escrow account's address in 2508 of FIG. 2 (subprocess 5, entity 08). At this point, this second path practically comes to an end even though an explicit termination is not used on the process diagram. Instead the subprocess awaits manual withdrawal by the owner in the last subprocess, 9.

Subprocess 9 in FIG. 2 represents the actions of an escrow smart contract that requires withdrawal rather than a transfer event. The subprocess begins with 2900 in FIG. 2 (subprocess 9, entity 00) representing a time delay. This is the time taken for the user to manually attempt to withdraw C from the escrow in 2902. The escrow smart contract code then looks up the Mi, i.e. maturity period in days, from a cache or from directly accessing the value from the regulatory authority in 2904 of FIG. 2 (subprocess 9, entity 04). In the decision node 2906 of FIG. 2 (subprocess 9, entity 06) the maturity of the escrowed funds is determined. If the funds, C, have matured, where the days since the deposit is greater than or equal to $M_P$, then the full amount of C is transferred to the owners' account address for C on the network where C resides. If the funds have not matured a lookup of the liquidity premium penalty, $L_P$, occurs in 2910 of FIG. 2 (subprocess 9, entity 10). This parameter is acquired directly or indirectly from the regulatory authority. Once L is available the subprocess splits into two parallel paths at 2912 of FIG. 2 (subprocess 9, entity 12). One path delivers the remainder, $C \cdot (1-L_P)$, after removing the liquidity premium penalty, to the users' wallet account address for C on the network hosting the token or coin at terminal node 2914 of FIG. 2 (subprocess 9, entity 14). The other path either transfers the penalty amount of $C \cdot L_P$ to some address or burns it at terminal node 2916 of FIG. 2 (subprocess 9, entity 16).

FIG. 3 is a process flow diagram with annotations showing digital asset flows comprised of subprocesses 0, 2, 4 and 8. FIG. 3 depicts an embodiment of the invention that uses pooling intermediaries in between the miners and the DLT's PoW based consensus layer. FIG. 3 is a mutation of FIG. 1 in that subprocess 1 is replaced by subprocess 2 to handle the pooling intermediary. All other subprocesses are identical with entities 1000-1010 in FIG. 1 mapping to entities 3000-3010 in FIG. 3 for subprocess 0, and entities 1400-1408 in FIG. 1 mapping to entities 3400-3408 in FIG. 3 for subprocess 4, and entities 1800-1816 in FIG. 1 mapping to entities 3800-3816 in FIG. 3 for subprocess 8. Please see paragraphs 46, 48, and 50 for the details on respective subprocesses 0, 4, and 8.

Subprocess 2 in FIG. 3 represents the actions of both the DLT and an intermediary juxtaposed between the miner and the DLT for pooling purposes. The pooling intermediary aggregates the proof of work from several miners to increase its frequency of earning rewards then distributing those rewards to members of the pool. Subprocess 0 hands off to subprocess 2 at 3200 in FIG. 3 (subprocess 2, entity 00). The pool configuration is part of the settings and/or are looked up based on the device's unique identifier that occurs in subprocess 0 in 3004 of FIG. 3 (subprocess 0, entity 04). The mining machine passes proof of work performed to the intermediary so it can aggregate it in 3202 (subprocess 2, entity 02) and presents it in 3204 FIG. 3 (subprocess 2, entity 04) to the DLT's PoW based consensus layer. The DLT then decides to reward or not to reward the pool for its work in branch node 3206 of FIG. 3 (subprocess 2, entity 06). If the reward is not granted then the subprocess terminates at terminal node 3208 of FIG. 3 (subprocess 2, entity 08). If the reward, $R_W \cdot LS$, where LS is the number of ledger systems, is granted, it is minted in 3210 of FIG. 3 (subprocess 2, entity 10) and distributed in 3212 of FIG. 3 (subprocess 2, entity 12) to a conversion intermediary for each miner member of the pool.

FIG. 3's subprocess 2 hands off to subprocess 4 which involves the action of the intermediary. Finally, it is followed up by subprocess 8 to transfer the appropriate amount of R to the owner's wallet account address and C to third parties while applying penalties.

FIG. 4 is a process flow diagram with annotations showing digital asset flows comprised of subprocesses 0, 2, 5, and 9. FIG. 4 depicts an embodiment of the invention that uses pooling intermediaries just like the embodiment in FIG. 3, however it uses an escrow mechanism with withdrawals rather than transfers to implement liquidity premium penalties. The embodiment in FIG. 3 uses subprocess 4 and 8, whereas the embodiment of FIG. 4 uses subprocess 5 instead of 4 and subprocess 9 instead of 8. All subprocesses have already been introduced in previous paragraphs 46, 55, 52, and 53 for respective subprocesses 0, 2, 5, and 9. For brevity their details will not be redefined.

FIG. 5 is a process flow diagram with annotations showing digital asset flows comprised of subprocesses 0, 3, 6, and 8. FIG. 5 depicts an embodiment of the invention that uses a hybrid mining pool intermediary with an integrated means to convert rewards into the digital asset targeted for price control. It uses subprocess 8 to impose liquidity premium penalties on transfer events instead of escrows on withdrawal events in subprocess 9. Subprocesses 0, and 8 have already be defined in paragraph 46, and 50 respectively. Subprocess 3 and 6 are defined in detail below.

Subprocess 3 in FIG. 5 combines the action of a mining pool with the conversion means. Miners present their work to the intermediary in 5300 of FIG. 5 (subprocess 3, entity 00). The pool aggregates the proof of work from a plurality of mining machines in 5302 of FIG. 5 (subprocess 3, entity 02), then presents this aggregate of work in 5304 of FIG. 5 (subprocess 3, entity 04) to the DLT's PoW consensus layer. The consensus layer decides in 5306 of FIG. 5 (subprocess 3, entity 06) whether or not rewards are to be given to the pool. If no reward is possible the subprocess terminates in terminal node 5308 of FIG. 5 (subprocess 3, entity 08) effectively making the DLT wait for more work to be presented by the pool. If a reward is to be granted to the pool, $R_W \cdot LS$, where LS is the number of ledger systems, it is minted and delivered to the pool in 5310 of FIG. 5 (subprocess 3, entity 10). Upon receipt the pool looks up, $P_C$, either from a cache or directly from the regulatory authority using one of the means of publication offered by the authority in 5312 of FIG. 5 (subprocess 3, entity 12). Once the $P_C$ parameter's value is available, the intermediary converts the appropriate amount of the rewards, C·LS, for all members of the pool in 5314 of FIG. 5 (subprocess 3, entity 14) in one single transaction rather than several for each miner. Once converted, the remaining rewards, $R_W \cdot LS (1-P_C)$, and the converted amount of the digital asset targeted for price control is distributed to all miners in the mining pool in 5316 of FIG. 5 (subprocess 3, entity 16).

Subprocess 6 in FIG. 5, only present in FIG. 5, represents a process pathway split into two short parallel process paths in 5600 of FIG. 5 (subprocess 6, entity 00) during the delivery phase of reward and digital asset distribution to each of the individual members of the hybrid pool intermediary. One path delivers the remainder of the reward per pool member, $R_W \cdot (1-P_C)$, to the account address of the miner (owner) on the reward granting network in terminal node 5602 of FIG. 5 (subprocess 6, entity 02) and terminates. The other path delivers the converted amount of the digital asset targeted for price control per pool member, C, to the account address of the miner (owner) on the DLT network hosting C in 5604 of FIG. 5 (subprocess 6, entity 04). For all practical purposes, 5604 could be considered a soft termination even though the process in FIG. 5 models it as an action in the process since the over process now requires a transfer action on the part of the owner to proceed.

In FIG. 5, subprocess 6 continues with subprocess 8, awaiting an indefinite amount of time for a transfer of C to occur upon which subprocess 8 applies liquidity premium penalties to the transfer if it is premature. The details of subprocess 8 have already been provided in paragraph 50.

FIG. 6 is a process flow diagram with annotations showing digital asset flows comprised of subprocesses 0, 3, 7, and 9. FIG. 6 depicts an embodiment of the invention that uses a hybrid pooling and converting intermediary while using the escrow withdrawal means of implementing liquidity premium penalties instead of transfers. All subprocesses except for subprocess 7 have already been defined in detail. See paragraphs 46, 59, and 53 for details on subprocesses 0, 3, and 9 respectively.

Subprocess 7 in FIG. 6, only present in FIG. 6, represents a process pathway split into two short parallel process paths in 6700 of FIG. 6 (subprocess 7, entity 00) during the delivery phase of reward and digital asset distribution into accounts and escrows associated with each pool member. One path delivers the remainder of the reward per pool member, $R_W \cdot (1-P_C)$, to the account address of the miner (owner) on the reward granting network in terminal node 6702 of FIG. 6 (subprocess 7, entity 02) and terminates. The other path delivers the converted amount of the digital asset targeted for price control per pool member, C, to the address of an escrow smart contract on the DLT network hosting C in 6704 of FIG. 6 (subprocess 7, entity 04). For all practical purposes, 6704 could be considered a soft termination even though the process in FIG. 6 models it as an action in the process since the over process now requires a manual withdrawal action (which might be automated as well) on the part of the miner owner to proceed. The escrow smart contract implementation may be a single contract parameterized to track all depositors (all miners in the pool receiving the digital asset) or may be a plurality of smart contracts with each instance dedicated specifically to a unique depositor and owner (which in this case is the miner member in the pool).

The embodiment in FIG. 6 completes the process after owners of C attempt to withdraw C from the escrow account into their own wallet accounts using subprocess 9. Subprocess 9 has already been defined in detail in paragraph 53 and will not be redefined here for brevity.

FIG. 7 depicts an embodiment of the management and publishing of process control parameters by a price regulating authority. The embodiment uses blockchain smart contracts and DApps to implement multiple control parameter notification and data access mechanisms. The process begins with a change submission in step 7001 of FIG. 7, which initiates a vote in step 7002 of FIG. 7. Several open source smart contracts exist for consensus voting and can be used to conduct a vote by the board of the regulating authority, i.e. a foundation or even a company. The idea is to have more than one person involved in authorizing a change in these regulating parameters. There will be some delay in entity 7003 of FIG. 7 and the vote may time out. If consensus is not reached within a set time entity 7004 of FIG. 7 terminates the process in terminal node 7005 of FIG. 7. If consensus is reached to accept the changes, then the changes are approved in step 7006 of FIG. 7 and published in step 7007 of FIG. 7. All parameter changes must be updated to their new values within a single transaction using a method on the smart contract to prevent inconsistent parameter configurations from being looked up. The change log, voting and overall audit history can also be kept on the blockchain. Once published on the blockchain in step 7007 of FIG. 7 the process splits at entity 7008 of FIG. 7 to denote the ability of smart contracts on the blockchain to look up the new values of parameters via method calls on the regulator's smart contract in terminal node 7009 of FIG. 7. The other path continues to generate events on step 7010 of FIG. 7 to notify listening DApps on the blockchain. There is a delay of time before detection in entity 7011 of FIG. 7, then DApps begin to react to the event. Entity 7012 in FIG. 7 breaks the detections into separate paths in the process to denote separate DApp detections. The detection of the event could be by several DApps: a REST gateway DApp updating its cache in step 7013 of FIG. 7, and a notifier DApp gateway which transduces blockchain events into messages on a MOM (Message-Oriented Middleware) topic or queue in step 7014 of FIG. 7 to announce changes are available to listeners. Step 7015 of FIG. 7 shows that other DApps may also detect the event on the blockchain. Smart contracts such as token smart contracts and other entities can easily lookup the parameters via the blockchain after publishing in step 7007 of FIG. 7, however bridges enabling other access mechanisms require DApps to convert events on the blockchain into equivalent updated values for the parameters through their own mechanisms. Intermediaries and miners can use the REST service for lookups of control parameters or update cached values of control parameters by listening for notifications on message queues/topics.

FIG. 8 depicts the process of an embodiment for the means to reconcile the delivery of purchased mining equipment. It is a long running process that starts when a customer purchases the equipment in starting node 8001 of FIG. 8. Once payment is confirmed in step 8002 of FIG. 8, many aspects of the purchase are recorded on the blockchain in the same transaction as in step 8003 of FIG. 8. Then there is a delay in 8004 of FIG. 8 until the unit destined for the customer has been manufactured in 8005 of FIG. 8. Once manufacturing is complete, an alpha numeric string of characters used to uniquely identify the mining machine is looked up in step 8006 of FIG. 8 and correlated with the recorded purchase on the blockchain in step 8007 of FIG. 8. Additional information such as the root public key of the trusted platform module (TPM) of the mining machine may be recorded as well to facilitate reconciliation. Once the mining machine's unique identifier and/or public root key is correlated with the purchase of the customer the unit is shipped in step 8008 of FIG. 8. After a shipping delay in 8009 of FIG. 8, the customer receives and unpackages the equipment and puts it online in step 8010 of FIG. 8. The equipment uses a tamper proof mechanism to safely execute the code to check if it has been reconciled in step 8011 of FIG. 8. The mining machine may perform the check in several ways including on the blockchain with a call to the manufacturer's smart contracts or via a REST call exposed by the manufacturer's DApp interfacing to the blockchain. If it has been reconciled, the unit continues normal operation in terminal node 8012 of FIG. 8, which terminates the reconciliation process. If it has not been reconciled, then code is executed to reconcile delivery of the merchandise in step 8013 of FIG. 8. There are several ways to implement the reconciliation step of 8013 in FIG. 8: one of which could use the root key of the mining machine to digitally sign its unique identifier and make a REST or a blockchain method call on the manufacturer's smart contract with the digitally signed envelope provided as an argument. A smart contract method or web service DApp can check the signature to confirm the public key of the signatory and confirm that the digitally signed unique identifier matches the unique identifier correlated with the merchandise which was recorded on the blockchain before shipping to the purchaser. At this point, the record is just labeled as reconciled. Several other ways of conducting tamper proof reconciliation are possible besides the mechanism used by this embodiment.

FIG. 9 depicts a combined approach for embodiments of the means to provide rebates to consumers while also providing subsidies to manufacturers for the production of mining equipment. The embodiment gives consumers a choice: to opt in or out of the rebate program. The rebate program requires the mandatory conversion of mined cryptocurrencies into price-controlled cryptocurrency which induces demand, and price increases. Those opting out of the rebate program for a purchase would not have the purchased mining equipment participating in the conversion process used to drive demand for the price-controlled cryptocurrency and so it makes sense for them to not have a claim to rebates resulting from the price differential of digital assets targeted for price control. When opting out, the value generated from the differential is instead redirected to subsidies for manufacturers to lower their product prices and make mining equipment more accessible. At face value, this embodiment appears to combine both means of providing rebates and subsidies mutually exclusively and this is true when focusing on the decision of each individual customer purchase. On the whole, when the scope expands to the population dynamics of a large group of customer purchases, some will choose the rebate while others will not. Thus, both means of rebates and subsidies will still co-exist within the population of purchases. Other embodiments may split the value derived from price differentials across the rebate and subsidies or embodiments may be completely uncoupled as separate processes. Another embodiment may completely ignore subsidies to redistribute the value to those opting for the rebate. The decision to showcase this preferred embodiment over others rests in the choice it gives customers while efficiently combining both means of rebates and subsidies to demonstrate how they can work together.

FIG. 9 is a process diagram of a long running process that begins with the shopping cart checkout by the consumer in the starting step 9001 of FIG. 9. Several steps, for example providing a shipping address, payment options etc. are omitted for brevity. The process continues with a manual action by the consumer to choose to participate in the rebate program in step 9002 of FIG. 9. Once this decision is made and all other information is collected to initiate payment processing in step 9003 of FIG. 9, the payment is confirmed in step 9004 of FIG. 9 and the transaction receipt is recorded on the blockchain in step 9005 of FIG. 9. Entity 9006 of FIG. 9 depicts a subset of parameters stored within the purchase record (i.e. not including the itemized list of the merchandise). After this point, a branch condition, 9007 of FIG. 9, takes into account the consumer's decision to participate in the rebate program or not. If the consumer rejected the rebate program, then a subsidy amount is calculated and registered with the subsidy fund which may be managed by the regulatory authority in step 9008 of FIG. 9. This can be a smart contract on the blockchain tasked with collecting and managing funds in the form of the digital asset targeted for price control. If the consumer opts to participate in the rebate program, then the subsidy is not be delivered to the fund and 9008 in FIG. 9 is bypassed. Both branches from 9007 converge on a delay entity in 9009 of FIG. 9. This delay represents the time taken to manufacture the mining device in 9010 of FIG. 9, but instead could have been modeled as the time taken to find stocked mining devices that have already been manufactured. 9011 of FIG. 9 represents a pre-shipping task to look up serial numbers and unique identifiers associated with the purchase followed by step 9012 of FIG. 9 where these values in entity 9013 of FIG. 9 (some parameters not shown) are written to the blockchain and associated with the consumer's original purchase record in entity 9006 of FIG. 9. These post manufacturing steps are presumed to be automated but can be manual. The product is then shipped manually to the customer in 9014 of FIG. 9 with a delay in 9015 of FIG. 9 until the product is received, started, and put online in the consumer's manual step 9016 of FIG. 9. Once the mining machine comes online, it checks to see if it has been reconciled at branch point 9017 of FIG. 9 which might entail connecting to a REST service or issuing method calls on a blockchain contract to check status. This part of the process as with most operations of the mining machine is made tamper proof by only allowing signed code handling these operations to be run (using for example a TPM with secure boot and digitally signed code execution). Several options for implementing tamper resistance exist but are left to the discretion of manufacturers. If not reconciled, the reconciliation step 9018 in FIG. 9 creates entity 9019 in FIG. 9 representing a reconciliation record linked to the specific purchase record associated with the mining equipment on the blockchain. For brevity the purchase of multiple mining machines in the same purchase transaction have been omitted from the process diagram. Once reconciliation complete a check in 9020 of FIG. 9 is performed to see if the mining machine's purchaser opted for the rebate program. If they have not, the delivery and receipt of the product is reported to the regulatory authority in 9021 of FIG. 9 to take some action, such as burning or sending an amount of the digital asset targeted for price control to the manufacturer as a subsidy. The items and amount of the hardware purchased are made available to determine how much of the subsidy to trickle to the manufacturer now that a purchase's delivery has been reconciled. If the user accepted the terms and opted into the rebate program in 9002 of FIG. 9, then the mining device does nothing with subsidies to converge with both branch paths on 9022 of FIG. 9 representing the mining machine going into continuous normal operating mode. Then there is a delay, 9023 of FIG. 9, representing the time between reconciliation and the consumer attempting to claim their rebate represented in manual step 9024 of FIG. 9. The rebate claiming may be handled through an online web application connected to the blockchain. The application checks with the blockchain contract maintaining purchase records in 9025 of FIG. 9 to lookup the purchase. There may be several purchases but for brevity and simplicity we will presume a single purchase: those in the art can easily extrapolate the process to handle claiming rebates on multiple purchases. Once again, a check is performed to determine if the consumer participated in the rebate program with this purchase in branch point 9026 of FIG. 9. If the user did not opt to participate in the rebate program the process flow terminates at terminal node 9027 of FIG. 9 which denies the consumer a rebate with a proper message that they're not eligible for the specific purchase. If the user did opt to participate in the rebate program, for a purchase, then another check is performed to see if the mining hardware was reconciled in branch point 9028 of FIG. 9. If it was not reconciled, then the process routes back to 9027 of FIG. 9 to deny the rebate with the proper message indicated reconciliation is required. If confirmation of reconciliation is positive, the rebate amount is calculated in step 9029 of FIG. 9 and delivered in terminal node 9030 of FIG. 9.

FIG. 9 step 9029 is left to the discretion of the implementors and their business requirements. Several equations can be used to determine the rebate amount. Virtually any and all information required should be captured and recorded on the blockchain in record entities 9006, 9013, and 9019 of FIG. 9. Regardless of the equations used by implementors, the resultant rebate is recommended to be commensurate with the purchase amount and proportional to the price difference of the digital asset targeted for price control in between the purchase and the time the consumer tried to claim their rebate. It would be detrimental to use an arbitrary amount that does not correlate with the economics of the price controlled digital asset. Furthermore, the consumer should be allowed to claim their rebate at any time after reconciliation with no rebate expiration period, however this choice is left to the discretion of those responsible for the implementation. An example equation which calculates the rebate amount denominated in price controlled digital assets proportional to both the hardware amount purchased as well as the price differential of the digital asset targeted for price control could be, $$R = \frac{\frac{H_{AMOUNT}}{P_{PURCHASE}} \cdot (P_{REBATE} - P_{PURCHASE})}{P_{REBATE}},$$

comprising:
(a) R, the rebate amount in digital assets targeted for price control, and
(b) $H_{AMOUNT}$ is the dollar amount of hardware purchased, and
(c) $P_{PURCHASE}$ is the dollar value of the digital asset targeted for price control at the time of purchasing the hardware, and
(d) $P_{REBATE}$ is the dollar value of the digital asset targeted for price control at the time of claiming the rebate.

The same equation can also be used for calculating the manufacturer subsidy amounts. However additional requirements may need to be factored into this decision such as on price negotiations and agreements to provide consumers with reasonable price points on the mining equipment. Essentially the regulatory authority determining the subsidy amount should do so while mandating proper pricing to end consumers.

FIG. 10 depicts an embodiment of establishing the first owner of cryptocurrencies minted in the mining process to establish a clean chain of possession. FIG. 10 is almost exactly the same as FIG. 6 wherein only one entity was modified and two new entities were created to demonstrate the embodiment. These modifications could have been introduced in any of the embodiments of FIGS. 1-6. For brevity we will not redefine the entire process in FIG. 6 which can be ascertained from the detailed description of FIG. 6 by simply substituting the first digit, 6 with 10 for FIG. 10 entities. The differences between FIG. 6 and FIG. 10 will be explained herein:

(a) Step 10316 of FIG. 10 was modified from 6316 of FIG. 6 to include "AND RECORD" which involves the creation of a record on the blockchain that associates the quantity of mined coins distributed by the hybrid intermediary with the purchased mining device. This way the first chain in the chain of possession of mined cryptocurrencies are recorded, and (b) Step 10918 of FIG. 10 is new and was added in between nodes 6906 and 6908 of FIG. 6 to depict the embodiment's recording of the first owner in the chain of possession for the digital asset targeted for price control with mature withdrawals, and (c) Step 10920 of FIG. 10 is new and was added in between nodes 6912 and 6914 of FIG. 6 to depict the embodiment's recording of the first owner in the chain of possession for the digital asset targeted for price control with immature withdrawals.

FIG. 10 depicts the introduction of steps needed to identify the first owner in the chain of custody. This is required to implement blockchain analyzers that can track the flows of coins and tokens between parties and determine the remainder of the chain of custody. These analyzers which have not been show on FIG. 10 allow for the calculation of taxable income as well as capital gains from holding these digital assets. With respect to bypassing sanctions and other illicit activities, having the first owner in the chain of possession makes it now possible to create two pools of identified, and unidentified mined coins in circulation. Those that have not been accounted for via KYC/AML necessarily require the focus of the proper regulatory authorities.

FIG. 11 is not the representation of an embodiment but rather a diagram representing the dynamics of flux between the MZM and M3 areas of liquidity when using this price regulating system. It is intended to help visualize the dynamics in effect and how important it is for demand pressure to leverage mining machines rather than human calculations to effectively produce a significant deflationary impact.

What is claimed is:

1. A method for regulating the price of digital assets, the method comprising the steps of:
    providing, via a plurality of ledger systems and/or a plurality of intermediaries in a blockchain network, one or more first digital assets, wherein each first digital asset is a mined digital asset that is claimed as a reward on a rewarding distributed ledger in the blockchain network, and wherein each first digital asset in the blockchain network is an illiquid fund in one of the following forms:
        a first cryptocurrency token, and
        a first cryptocurrency coin;
    automatically and mandatorily converting, using a tamperproof tool in the blockchain network, a pre-determined percentage of the one or more first digital assets claimed as corresponding one or more rewards by exchanging respective rewards into a corresponding one or more second digital assets in the blockchain network, wherein each second digital asset is targeted for price control, and wherein each second digital asset in the blockchain network is a liquid fund in one of the following forms:
        a second cryptocurrency token, and
        a second cryptocurrency coin; and
    in response to the automatic conversion, influencing, via a regulating authority in the blockchain network, a transfer of ownership of the corresponding one or more second digital assets, thereby affecting circulating supply and demand of second digital assets;
    determining a rebate amount based on storing and calculating information on a distributed ledger in the blockchain network using one or more smart contracts, wherein the step of determining comprising:
    irrevocably recording, on said blockchain network, purchase information including a hardware purchase amount, and prices of the one or more second digital assets; and
    calculating the rebate amount from the purchase information and the prices of the one or more second digital assets at the time when the rebate amount is claimed, wherein the rebate amount is determined in proportion to the difference in price of the one or more second digital assets and proportional to the hardware purchase amount,
    wherein the one or more second digital assets are the second cryptocurrency tokens on the blockchain network backed by smart contract code, and wherein the step of determining the rebate amount comprising:
    minting the second cryptocurrency tokens in the blockchain network;
    recording sales of mining hardware on the blockchain network;
    assigning the minted tokens to one or more purchaser accounts in the blockchain network without allowing purchasers to modify corresponding purchaser accounts until reconciliation; and
    destroying or transferring, in the blockchain network, excess minted tokens assigned to the one or more purchaser accounts when the purchasers claim their respective rebates; and
    correlating, in the blockchain network, remaining tokens in the purchaser accounts to the amount of the mining hardware and a shift in price of the second cryptocurrency tokens.

2. The method of claim 1, further comprising the steps of:
    controlling, via a set of control parameters issued by the regulating authority in the blockchain network, the automatic conversion and the influencing steps;
    communicating, via the regulating authority in the blockchain network, values of the set of control parameters to the plurality of ledger systems and/or the plurality of intermediaries in the blockchain network; and
    varying, via the regulating authority in the blockchain network, the set of control parameters to impact the circulating supply and demand of the second digital assets to influence the prices of the second digital assets.

3. The method of claim 2, wherein the step of influencing includes:
    influencing the transfer of ownership in the blockchain network via logic within a relevant second cryptocurrency token's smart contract code; and
    performing, in the blockchain network, one or more maturity checks before the transfer, wherein, at maturity, an owner of the relevant second cryptocurrency token collects 100% of token's value on transfer.

4. The method of claim 3, wherein the step of influencing the transfer comprises: placing the relevant second cryptocurrency token in an escrow in the blockchain network until token's maturity to permit the owner to collect 100% of the token's value on mature withdrawal.

5. The method of claim 2, wherein the automatic conversion is performed by the plurality of ledger systems, wherein the ledger systems are cryptocurrency mining devices, wherein a portion of the first cryptocurrency coins are converted, wherein mining device uses the control parameters to convert only a specified amount of the first cryptocurrency coins into the corresponding one or more second digital assets at predetermined intervals or an interval regulated by one of the control parameters.

6. The method of claim 1, further comprising the steps of:
   determining a subsidy assistance amount in the blockchain network;
   reconciling the plurality of ledger systems in the blockchain network; and
   offering to one or more manufacturers, in the blockchain network, the subsidy assistance amount to provide protection against price fluctuations during the sales and manufacturing of the plurality of ledger systems,
   wherein the step of determining the subsidy assistance amount is based on storing and calculating information on a distributed ledger in the blockchain network using one or more smart contracts, wherein the step of determining comprising:
   irrevocably recording, on the blockchain network, purchase information including a hardware purchase amount and prices of the one or more second digital assets at the time when each of the plurality of ledger systems is purchased; and
   calculating the subsidy assistance amount from the purchase information and the prices of the one or more second digital assets at the timewhen the subsidy assistance amount is claimed, wherein the subsidy assistance amount is determined in proportion to the difference in price of the one or more second digital assets and proportional to the hardware purchase amount or the cost over runs by a manufacturer of the purchased hardware and
   wherein the step of determining the subsidy assistance amount is based on storing and calculating information on a distributed ledger in the blockchain network using one or more smart contracts, wherein the step of determining comprising:
   irrevocably recording, on the blockchain network, purchase information including a hardware purchase amount and prices of the one or more second digital assets at the time when each of the plurality of ledger systems is purchased; and
   calculating the subsidy assistance amount from the purchase information and the prices of the one or more second digital assets at the timewhen the subsidy assistance amount is claimed, wherein the subsidy assistance amount is determined in proportion to the difference in price of the one or more second digital assets and proportional to the hardware purchase amount or the cost over runs by a manufacturer of the purchased hardware.

7. The method of claim 6, wherein the one or more second digital assets are the second cryptocurrency tokens on the blockchain network backed by smart contract code, and wherein the step of determining the subsidy assistance amount comprising:
   minting the second cryptocurrency tokens in the blockchain network;
   recording sales of mining hardware on the blockchain network;
   assigning the minted tokens to one or more manufacturer accounts in the blockchain network without allowing the one or more manufacturers to modify corresponding manufacturer accounts until reconciliation; and
   destroying or transferring, in the blockchain network, excess minted tokens assigned to the one or more manufacturer accounts when the one or more manufacturers claim their respective subsidy assistance amounts; and
   correlating, in the blockchain network, remaining tokens in the one or more accounts to the amount of the mining hardware and a shift in price of the second cryptocurrency tokens.

8. The method of claim 1, further comprising the step of:
   correlating, in the blockchain network, an owner of a ledger system with corresponding first digital assets mined with mining hardware associated therewith; and
   further correlating, in the blockchain network, the owner with respective second digital assets associated with owner-specific first digital assets.

\* \* \* \* \*